Oct. 16, 1951     H. M. RAY ET AL     2,571,943
COOKING RANGE RACK MANIPULATOR
Filed May 27, 1949
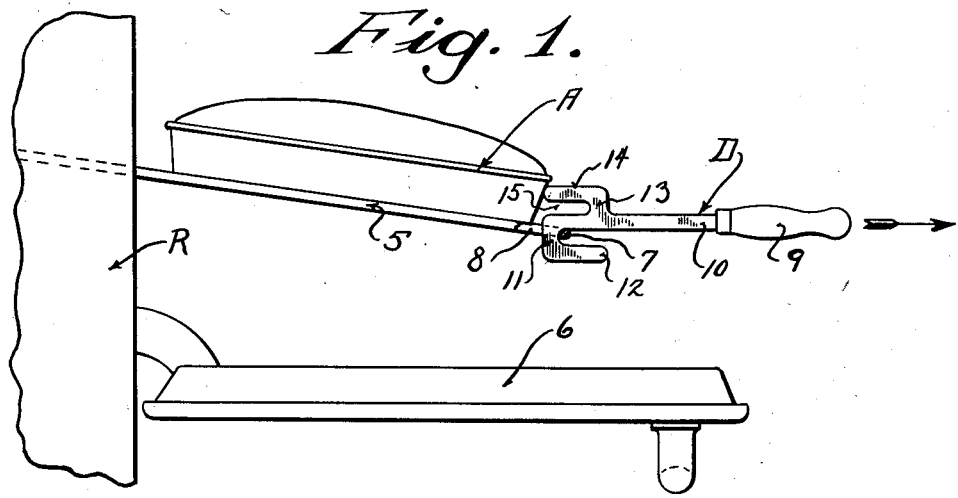
Fig. 1.
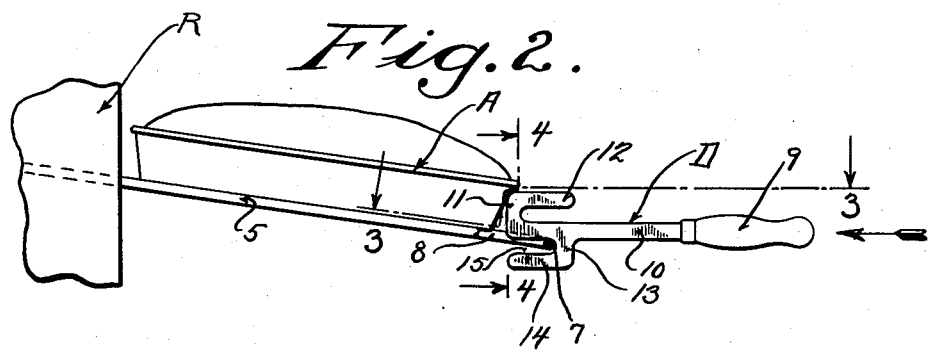
Fig. 2.
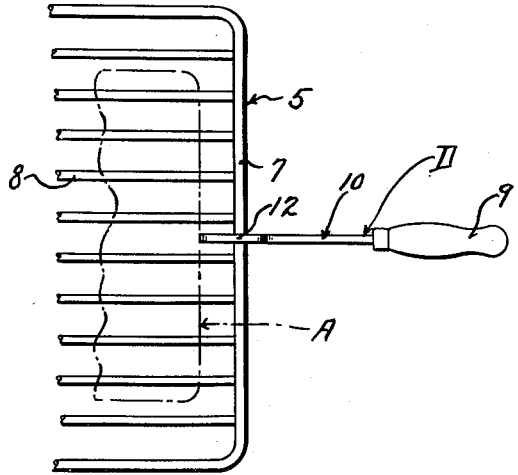
Fig. 3.
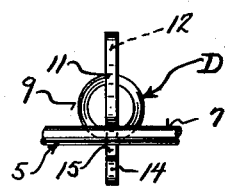
Fig. 4.
INVENTORS
HELEN M. RAY
RALPH A. RAY
BY 
ATTORNEYS Patented Oct. 16, 1951

2,571,943

UNITED STATES PATENT OFFICE 2,571,943

COOKING RANGE RACK MANIPULATOR

Helen M. Ray and Ralph A. Ray, Kenosha, Wis.; said Ralph A. Ray assignor by decree of distribution to said Helen M. Ray Application May 27, 1949, Serial No. 95,656

1 Claim. (Cl. 294—1)

This invention appertains to household appliances, and more particularly to a novel kitchen or cooking range utensil.

One of the primary objects of the invention is to provide a novel cooking range appliance for facilitating the pulling out and pushing in of oven racks incident to the removal or basting and observation of articles being cooked in the oven.

Much difficulty has been experienced by housewives and cooks in the manipulation of oven racks during the baking and broiling of food. Not only are the racks hot and difficult to hold and manipulate with a cloth or pad, but as the racks are pulled out they usually tilt downward under the weight of the articles thereon, and the hot articles and pans slide forwardly against the hands of the manipulator, often causing severe accidents.

It is, therefore, another salient object of the invention to provide a utensil which will not only effect the easy manipulation of the oven rack, but which will efficiently prevent articles on the rack from sliding onto the floor or against the hands of the manipulator.

A still further object of the invention is to provide a cooking range utensil of the above character, which will be durable and efficient in use, one that will be simple and easy to manufacture and one which can be placed upon the market and sold at a small cost.

With these and other objects in view, the invention consists in the novel construction, arrangement and formation of parts, as will be hereinafter more specifically described and claimed and illustrated in the accompanying drawing, in which drawing:

Figure 1 is a fragmentary, side elevational view of a cooking range showing the use of our novel utensil for withdrawing a rack from an oven.

Figure 2 is a view similar to Figure 1, and showing the implement used for pushing back the rack within the oven to its normal position.

Figure 3 is a fragmentary top plan view of the oven rack showing the utensil in top plan for illustrating the use of the utensil for pushing back the rack into the oven.

Figure 4 is a fragmentary vertical sectional view taken on the line 4—4 of Figure 3, looking in the direction of the arrows.

Referring to the drawing in detail, wherein similar reference characters designate corresponding parts throughout the several views, the letter D generally indicates our novel kitchen device or utensil for manipulating a rack 5 of a cooking range R.

The cooking range R forms no part of the present invention and it is to be understood that the range can be of any type now on the open market, and includes an oven, having a door 6 to facilitate the placing of food in the oven and the sliding in and out of the racks 5. The racks 5 are also of the type commonly found in cooking ovens and can include an open, rectangular frame having a front bar 7, and supporting bars or rails 8.

The oven rack utensil or device D preferably includes a manipulating handle 9, formed from wood or other desired material, preferably of a character which will prevent the quick transmission of heat. Embedded in the handle 9, in any desired way, is a forwardly extending shank 10. The extreme front end of the shank 10 has formed thereon a right angularly extending arm 11, and the arm in turn has formed thereon a rearwardly directed leg 12. The shank 10, the arm 11 and the leg 12, define a hook for a purpose, which will be later set forth, and it is to be understood that the arm 11 constitutes a stop, as will be also more fully hereinafter pointed out. The shank 10, intermediate its ends, is provided with a right angularly extending arm 13 and this arm is spaced from the arm 11, and projects from the opposite side of the shank from the arm 11. The arm 13 has formed on its outer end a forwardly extending leg 14, which preferably terminates in vertical alignment with the outer edge of the arm 11. The shank 10 and the arm 14 define a throat 15, for a purpose, which will later appear. The rear edge of the arm 13 preferably terminates in vertical alignment with the outer or rear end of the leg 12 and the rear edge of the arm 13, constitutes a stop shoulder, as will also hereinafter appear.

The shank 10, the arms 11 and 13 and the legs 12 and 14 are preferably stamped from a single piece of sheet metal, for the purpose of economy and ease of manufacture, and obviously the structure is such that the device can be made at an extremely low cost.

In use of the novel device, when it is desired to pull out an oven rack 5 for any purpose (see Figure 1), the hook defined by the arm 11 and the leg 12 is disposed lowermost and the same is hooked over the front bar 7 of the rack. This disposes the leg 14 uppermost and facing toward the rack and above the rack. By pulling out on the handle 9 the rack can be easily withdrawn the distance desired from the oven and upon the sliding forward of the article A on the rack the forward end of the leg 12 will stop the article and hold the same from falling off the rack and against the hands of the manipulator.

When it is desired to return the rack to its normal position within the oven (see Figure 2), the position of the device D is reversed, so that the leg 12 will be uppermost and above the rack with the front edge of the arm 11 facing the rack. The front bar 7 of the rack is received within the throat 15, defined by the shank 10 and the leg 14, and by pushing forwardly on the handle 9, the rack can be easily returned within the oven. Obviously, the front edge of the arm 11 will hold the article A against forward sliding movement. It is to be also noted that when the bar 7 of the rack 5 is within the throat 15, that the leg 14 can be utilized to lift up the rack to a horizontal position to facilitate the movement thereof into the oven.

From the foregoing description, it can be seen that we have provided an exceptionally simple and durable form of cooking range over rack manipulator.

Changes in details may be made without departing from the spirit or the scope of this invention, but what we claim as new is:

As a new article of manufacture an oven rack manipulator for cooking ranges struck from a single blank of sheet metal comprising a flat longitudinally extending shank, an arm on the forward end of the shank extending laterally from one edge thereof defining a stop for pans, a rearwardly extending leg on the arm forming in conjunction with the arm and the shank an oven rack engaging hook, a second arm on the shank intermediate the ends thereof and projecting laterally from the other edge of the shank in the opposite direction from the first arm, a forwardly extending leg on the second arm defining a stop for pans and in conjunction with the second arm and shank a throat for receiving oven racks.

HELEN M. RAY.
RALPH A. RAY.

REFERENCES CITED

The following references are of record in the file of this patent:

UNITED STATES PATENTS

| Number | Name | Date |
|---|---|---|
| 1,319,324 | Clement | Oct. 21, 1919 |
| 1,401,046 | Clymer | Dec. 20, 1921 |
| 1,439,860 | Breen | Dec. 26, 1922 |

FOREIGN PATENTS

| Number | Country | Date |
|---|---|---|
| 137,682 | Switzerland | Jan. 31, 1930 |